US011822196B2

(12) United States Patent
Cheng et al.

(10) Patent No.: US 11,822,196 B2
(45) Date of Patent: Nov. 21, 2023

(54) ARRAY SUBSTRATE HAVING UNIFORM ELECTRIC FIELD AND LIQUID CRYSTAL DISPLAY

(71) Applicants: Beijing BOE Technology Development Co., Ltd., Beijing (CN); BOE TECHNOLOGY GROUP CO., LTD., Beijing (CN)

(72) Inventors: Hongfei Cheng, Beijing (CN); Pan Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 666 days.

(21) Appl. No.: 16/966,592

(22) PCT Filed: Jul. 25, 2019

(86) PCT No.: PCT/CN2019/097702
§ 371 (c)(1),
(2) Date: Jul. 31, 2020

(87) PCT Pub. No.: WO2021/012262
PCT Pub. Date: Jan. 28, 2021

(65) Prior Publication Data
US 2023/0087495 A1    Mar. 23, 2023

(51) Int. Cl.
*G02F 1/1362* (2006.01)
*G02F 1/1333* (2006.01)
*G02F 1/1343* (2006.01)

(52) U.S. Cl.
CPC .... *G02F 1/136286* (2013.01); *G02F 1/13338* (2013.01); *G02F 1/134309* (2013.01)

(58) Field of Classification Search
CPC .................. G02F 1/13338; G02F 1/136286
See application file for complete search history.

(56) References Cited

U.S. PATENT DOCUMENTS 9,606,657 B2    3/2017  Yang et al.
2012/0086654 A1  4/2012  Song
(Continued)

FOREIGN PATENT DOCUMENTS

CN    102445799 A    5/2012
CN    102760017 A    10/2012
(Continued)

OTHER PUBLICATIONS

European Patent Office, Extended European Search Report dated May 20, 2022, for corresponding EP application 19930173.0.
(Continued)

*Primary Examiner* — Lauren Nguyen
(74) *Attorney, Agent, or Firm* — HOUTTEMAN LAW LLC

(57) ABSTRACT

An array substrate includes at least one driving electrode region and at least one sensing electrode region which are alternately arranged along a row direction and are disconnected from each other, each driving electrode region and each sensing electrode region include one first common electrode and one second common electrode respectively, at least one driving electrode line continuously passes through the driving electrode region and the sensing electrode region alternately arranged along the row direction. The first common electrode in the driving electrode region is connected to the driving electrode line through at least one first through hole, the second common electrode in the sensing electrode region is disconnected from the driving electrode line.

20 Claims, 6 Drawing Sheets

(56) References Cited

U.S. PATENT DOCUMENTS

| | | | |
|---|---|---|---|
| 2012/0274603 A1 | 11/2012 | Kim et al. | |
| 2014/0118277 A1* | 5/2014 | Kim | G06F 3/0412 345/173 |
| 2015/0309630 A1* | 10/2015 | Yang | G09G 3/36 345/206 |
| 2018/0321770 A1* | 11/2018 | Zhou | G06F 3/0443 |
| 2020/0226347 A1 | 7/2020 | Kurasawa et al. | |

FOREIGN PATENT DOCUMENTS

| | | |
|---|---|---|
| CN | 103760708 A | 4/2014 |
| CN | 105487720 A | 4/2016 |
| CN | 109614002 A | 4/2019 |
| WO | WO 2019065937 A1 | 4/2019 |

OTHER PUBLICATIONS

China Patent Office, First Office Action dated Jul. 30, 2020, for corresponding Chinese application 201990000087.9.

* cited by examiner

ARRAY SUBSTRATE HAVING UNIFORM ELECTRIC FIELD AND LIQUID CRYSTAL DISPLAY

TECHNICAL FIELD

The present disclosure relates to the technical field of display, and in particular, to an array substrate and a liquid crystal display.

BACKGROUND

LCD displays have been widely used in the market. Due to their simpler and faster human-computer interaction, LCDs with touch control or touch functions have become more and more popular. In-cell touch display screens have the advantages of being light and thin, increased definition and low cost, and therefore, have been steadily and continuously growing in high-end display markets.

SUMMARY

An array substrate is provided in the present disclosure. The array substrate includes at least one driving electrode region and at least one sensing electrode region which are alternately arranged along a row direction and are disconnected from each other, each driving electrode region includes one first common electrode and each sensing electrode region includes one second common electrode respectively. At least one driving electrode line extends along the row direction and continuously passes through the driving electrode region and the sensing electrode region alternately arranged along the row direction. The first common electrode in the driving electrode region is connected to the driving electrode line through at least one first through hole, and the second common electrode in the sensing electrode region is disconnected from the driving electrode line. The sensing electrode region is formed therein with at least one second dummy driving electrode line parallel to the driving electrode line, and the second common electrode in the sensing electrode region is connected to the second dummy driving electrode line through at least one fifth through hole.

In some embodiments, a number of the fifth through holes is the same as a number of the first through holes.

In some embodiments, the driving electrode region is formed therein with at least one first dummy driving electrode line parallel to the driving electrode line.

In some embodiments, the array substrate includes a plurality of pixel units arranged in a plurality of rows and a plurality of columns. A plurality of adjacent rows of pixel units are disposed with one driving electrode line. Each pixel unit where the driving electrode line is not formed in the sensing electrode region is formed with one second dummy driving electrode line therein.

In some embodiments, each pixel unit where the driving electrode line is not formed in the driving electrode region is formed with one first dummy driving electrode line therein. The first dummy driving electrode line is disconnected from the second dummy driving electrode line.

In some embodiments, first common electrodes in driving electrode regions adjacent in a column direction are separated from each other. The second common electrodes in the sensing electrode regions are formed as one piece in the column direction. The first common electrode is disconnected from the adjacent second common electrode in the row direction.

In some embodiments, the first common electrode in each driving electrode regions is formed thereon with at least one transverse dummy sensing electrode line and at least one longitudinal dummy sensing electrode line. The at least one transverse dummy sensing electrode line is parallel to the driving electrode line in the row direction, and the at least one longitudinal dummy sensing electrode line is arranged in a column direction and connected to the at least one transverse dummy sensing electrode line. The second common electrode in each sensing electrode region is formed thereon with at least one transverse sensing electrode line and at least one longitudinal sensing electrode line, the at least one transverse sensing electrode line parallel to the driving electrode line in the row direction, and the at least one longitudinal sensing electrode line arranged in the column direction and connected to the at least one transverse sensing electrode line.

In some embodiments, the array substrate includes a plurality of pixel units arranged in a plurality of rows and columns. Each pixel unit in the driving electrode region is formed therein with one transverse dummy sensing electrode line. Every multiple adjacent columns of pixel units in the driving electrode region are disposed with one longitudinal dummy sensing electrode line. Each pixel unit in the sensing electrode region is formed therein with one transverse sensing electrode line. Every multiple adjacent columns of pixel units in the sensing electrode region are disposed with one longitudinal sensing electrode line.

In some embodiments, the first common electrode is connected to the driving electrode line through two first through holes in each driving electrode region, and the second common electrode is connected to the second dummy driving electrode line through two fifth through holes in each sensing electrode region.

In some embodiments, the two fifth through holes are respectively located in the second dummy driving electrode lines on two sides of the driving electrode line.

In some embodiments, the two second through holes are both located in the second dummy driving electrode line on one side of the driving electrode line.

In some embodiments, both the first and second dummy driving electrode lines are intermittent in the first and second common electrode regions.

In some embodiments, both the first and second dummy driving electrode lines are continuous in the driving electrode region and the sensing electrode region.

In some embodiments, both the first and second dummy driving electrode lines are intermittent or continuous in the driving electrode region and the sensing electrode region, and a size of the sensing electrode region in the row direction is smaller than a size of the driving electrode region in the row direction.

In some embodiments, the transverse and longitudinal dummy sensing electrode lines are on and in direct contact with the first common electrode in the driving electrode region, and the transverse and longitudinal sensing electrode lines are on and in direct contact with the second common electrode in the sensing electrode region.

In some embodiments, the array substrate includes a plurality of gate lines and a plurality of data lines. In the driving electrode region, the driving electrode line is located on the same layer as the gate lines and parallel to the gate lines, an orthographic projection of the driving electrode line on a base substrate of the array substrate overlaps an orthographic projection of the transverse dummy sensing electrode line in the same row as the driving electrode line on the base substrate, the first dummy driving electrode line is located on the same layer as the gate lines and parallel to the gate lines, an orthographic projection of the first dummy driving electrode line on the base substrate overlaps an orthographic projection of the transverse dummy sensing electrode line in the same row as the first dummy driving electrode line on the base substrate, and an orthographic projection of the longitudinal dummy sensing electrode line on the base substrate overlaps an orthographic projection of the data line on the base substrate.

In some embodiments, the array substrate includes a plurality of gate lines and a plurality of data lines. In the sensing electrode region, the driving electrode line is located on the same layer as the gate lines and parallel to the gate lines, an orthographic projection of the driving electrode line on the base substrate overlaps an orthographic projection of the transverse sensing electrode line in the same row as the driving electrode line on the base substrate, the second dummy driving electrode line is located on the same layer as the gate lines and parallel to the gate lines, an orthographic projection of the second dummy driving electrode line on the base substrate overlaps an orthographic projection of the transverse sensing electrode line in the same row as the second dummy driving electrode line on the base substrate, and an orthographic projection of the longitudinal sensing electrode line on the base substrate overlaps an orthographic projection of the data line on the base substrate.

In some embodiments, the array substrate includes a plurality of pixel units arranged in a plurality of rows and a plurality of columns. A pixel unit having the driving electrode line in the driving electrode region includes: a base substrate; an active layer located on the base substrate; a gate insulating layer covering the active layer; a gate line and the driving electrode line located on the gate insulating layer; an interlayer insulating layer covering the gate line, the driving electrode line and the gate insulating layer; a data line, a drain and a first auxiliary electrode located on the interlayer insulating layer, with the data line connected to one side of the active layer through a second through hole, the drain connected to the other side of the active layer through a third through hole, and the first auxiliary electrode connected to the driving electrode line through a six through hole; a planarization layer covering the data line, the drain, the first auxiliary electrode and the interlayer insulating layer; the first common electrode located on the planarization layer, with the transverse and longitudinal dummy sensing electrode lines being on and in direct contact with the first common electrode, and the first common electrode connected to the first auxiliary electrode through the first through hole; a first insulating layer covering the first common electrode, the transverse dummy sensing electrode line, the longitudinal dummy sensing electrode line and the planarization layer; and a pixel electrode on the first insulating layer and connected to the drain through a fourth through hole.

In some embodiments, the array substrate includes a plurality of pixel units arranged in a plurality of rows and a plurality of columns. At least one of the plurality of pixel units in the sensing electrode region and adjacent, in a row direction, to a pixel unit including the driving electrode line includes: a base substrate; an active layer located on the base substrate; a gate insulating layer covering the active layer; a gate line and the second dummy driving electrode line located on the gate insulating layer; an interlayer insulating layer covering the gate line, the second dummy driving electrode line and the gate insulating layer; a data line, a drain and a second auxiliary electrode which are located on the interlayer insulating layer, with the data line connected to one side of the active layer through a second through hole, the drain connected to the other side of the active layer through a third through hole, and the second auxiliary electrode connected to the second dummy driving electrode line through a lower portion of the fifth through hole; a planarization layer covering the data line, the drain, the second auxiliary electrode and the interlayer insulating layer; the second common electrode located on the planarization layer, with the transverse and longitudinal sensing electrode lines located on and in direct contact with the second common electrode, and the second common electrode connected to the second auxiliary electrode through an upper portion of the fifth through hole; a first insulating layer covering the second common electrode, the transverse sensing electrode line, the longitudinal sensing electrode line and the planarization layer; and a pixel electrode located on the first insulating layer and connected to the drain through a fourth through hole.

According to another aspect of the disclosure, a touch liquid crystal display including above array substrate is provided.

DETAILED DESCRIPTION

Figure 1:
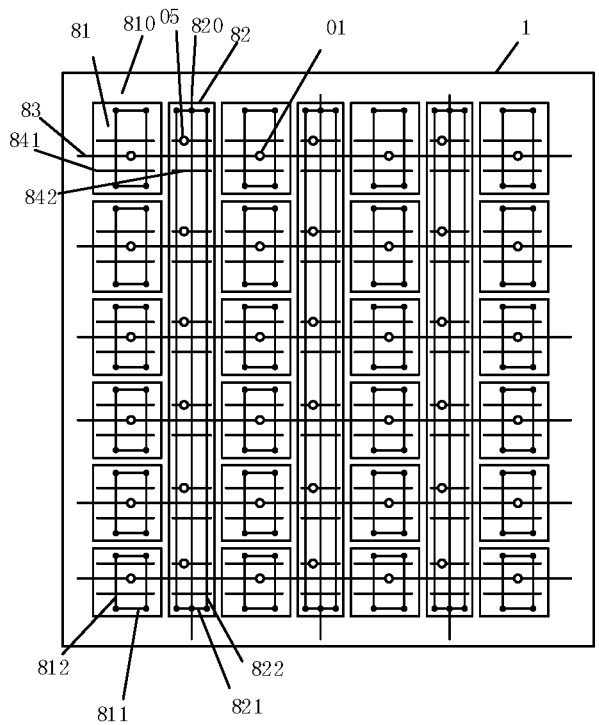
FIG. 1 is a plan view of a touch electrode of an array substrate according to an embodiment of the present disclosure.

In order to enable those skilled in the art to better understand the technical solutions of the present disclosure, the present disclosure will be described in detail below in conjunction with the accompanying drawings and specific embodiments.

The embodiments of the present disclosure will be described below, the examples of the embodiments are illustrated by the accompanying drawings, and the same or similar reference numerals always refer to the same or similar elements, or elements having the same or similar functions. The embodiments described below with reference to the accompanying drawings are illustrative and merely for explaining the present disclosure, and should not be considered as limitation to the present disclosure.

According to some embodiments of the present disclosure, for a display panel with a touch function, the array substrate of the display panel is provided with common electrodes, and at least a part of the common electrodes also function as touch electrodes. That is, such electrodes serve as the touch electrodes when a touch action is received, and serves as the common electrodes when no touch action is received. In order to distinguish, the common electrode region for providing a touch driving function is referred to as a driving electrode region, and the common electrode region for providing a touch sensing function is referred to as a sensing electrode region in the present disclosure. The common electrodes in the driving electrode regions are referred to as first common electrodes, and the common electrodes in the sensing electrode regions are referred to as second common electrodes. The first common electrodes and the electrode lines located on the first common electrodes in the driving electrode regions are referred to as driving electrodes, and the second common electrodes and the electrode lines located on the second common electrodes in the sensing electrode regions are referred to as sensing electrodes.

With reference to FIG. 1, the arrangement of the common electrodes and the electrode lines thereon of an array substrate will be described in detail below. A plurality of first common electrodes 81 and a plurality of second electrodes 82 are alternately arranged on an array substrate in a row direction and are separated from each other. Adjacent first common electrodes 81 are separated from each other in a column direction, and the second common electrodes 82 are uninterrupted or continuous in the column direction. Accordingly, the array substrate is divided into a plurality of driving electrode regions 810 and a plurality of sensing electrode regions 820 alternately arranged in the row direction. Driving electrode lines 83 are disposed along the row direction, and continuously pass through the driving electrode regions 810 and the sensing electrode regions 820 alternately arranged along the row direction. Sensing electrode lines are disposed on the second common electrode 82 in the sensing electrode region 820, and include transverse sensing electrode lines 821 and longitudinal sensing electrode lines 822, which are connected to each other. In order to reduce an influence of the sensing electrodes in the sensing electrode regions on electrical signals so as to obtain a uniform electrical field in the array substrate, dummy sensing electrode lines are disposed on the first common electrode 81 in the driving electrode region 810, and include transverse dummy sensing electrode lines 811 and longitudinal dummy sensing electrode lines 812, which are connected to each other. Further, since the connection of the driving electrode line 83 with the first common electrode 81 in the driving electrode region also affects distribution of the electric field of the array substrate, first dummy driving electrode lines 841 and second dummy driving electrode lines 842 are accordingly disposed in the driving electrode regions 810 and the sensing electrode regions 820 respectively. The driving electrode line 83, the first dummy driving electrode line 841, the second dummy driving electrode line 842 and gate line 4 are disposed on the same layer. The driving electrode line 83 is connected to the first common electrodes 81 through a through hole, and thus the distribution of the electric field of the array substrate changes due to the through hole. Therefore, the through hole is formed in the sensing electrode region 820 for connecting the second dummy driving electrode lines 842 with the second common electrodes 82, so as to ensure a more uniform electric field of the array substrate.

In the present disclosure, the first common electrode 81, and the transverse dummy sensing electrode lines 811 and the longitudinal dummy sensing electrode lines 812 located on the first common electrode 81 are referred to as a driving electrode. The second common electrode 82, and the transverse sensing electrode lines 821 and the longitudinal sensing electrode lines 822 located on the second common electrode 82 are referred to as a sensing electrode. The longitudinal dummy sensing electrode line 812 and the transverse dummy sensing electrode line 811 are formed in the same layer as the longitudinal sensing electrode line 822 and the transverse sensing electrode line 821. The longitudinal dummy sensing electrode lines 812 and the transverse dummy sensing electrode lines 811 in the driving electrode region 810 are disconnected from the longitudinal sensing electrode lines 822 and the transverse sensing electrode lines 821 in the sensing electrode region 820. The longitudinal dummy sensing electrode lines 812 and the transverse dummy sensing electrode lines 811 in a driving electrode region 810 are disconnected from the longitudinal dummy sensing electrode lines 812 and the transverse dummy sensing electrode lines 811 in another driving electrode region 810 adjacent to the driving electrode region 810 along the column direction. The driving electrode lines 83 in the driving electrode regions 810 and the sensing electrode regions 820 are connected together in the row direction. The first dummy driving electrode lines 841 in the driving electrode region 810 are disconnected from the second dummy driving electrode lines 842 in the sensing electrode region 820.

From the standpoint of pixel structures, an array substrate includes a plurality of pixel units arranged in a plurality of rows and a plurality of columns. A plurality of data lines are respectively arranged between the plurality of columns of pixel units along a column direction, and a plurality of gate lines are respectively arranged between the plurality of rows of pixel units along a row direction. One driving electrode line is provided for a plurality of adjacent rows of pixel units. The driving electrode lines and the gate lines are located on the same layer and are parallel to one another, but an orthographic projection of the driving electrode line on a base substrate does not overlap an orthographic projection of the gate line on the base substrate.

In the present disclosure, the row direction refers to a direction along which the gate lines extend, and the column direction refers to a direction along which the data lines extend.

In some embodiments, the sensing electrode region 820 is smaller than the driving electrode region 810 in size along the row direction, that is, the number of the pixel units in a sensing electrode region 820 along the row direction is less than that of the pixel units in the driving electrode region 810.

One driving electrode line 83 is provided for a plurality of adjacent rows of pixel units. One second dummy driving electrode line 842 is disposed for each pixel unit in the sensing electrode region where the driving electrode line is not formed. One first dummy driving electrode line 841 is disposed for each pixel unit in the driving electrode regions 810 where the driving electrode line 83 is not formed. The first dummy driving electrode lines 841 are disconnected from the second dummy driving electrode line 842.

One transverse dummy sensing electrode line 811 is disposed for each pixel unit in the driving electrode regions 810, and one longitudinal dummy sensing electrode line 812 is disposed for/associated with every multiple adjacent columns of pixel units in the driving electrode regions 810. The transverse dummy sensing electrode lines 811 are parallel to the driving electrode lines 83. The transverse dummy sensing electrode lines 811 of the pixel units adjacent to each other in the row direction may be connected together. The longitudinal dummy sensing electrode lines 812 disposed in the column direction connects the transverse dummy sensing electrode lines 811 of all rows. Multiple longitudinal dummy sensing electrode lines 812 are disposed along the column direction in each of the driving electrode region 810. In some embodiments, an interval between the adjacent longitudinal dummy sensing electrode lines 812 in a driving electrode region 810 is the same as an interval between the adjacent longitudinal sensing electrode lines 822 in an adjacent sensing electrode region 820, so as to obtain a uniform electric field. The longitudinal dummy sensing electrode lines 812 in each driving electrode region 810 may be continuous in the column direction, but are disconnected from the longitudinal dummy sensing electrode lines 812 in another driving electrode region 810 adjacent to the driving electrode region in the column direction.

One transverse sensing electrode line 821 is located in the pixel units in the sensing electrode regions 820, and each transverse sensing electrode line 821 is parallel to the driving electrode lines 83. A plurality of longitudinal sensing electrode lines 822 are disposed along the column direction in each sensing electrode regions 820 to connect the transverse sensing electrode lines 821, and every multiple adjacent columns of pixel units in each sensing electrode region 820 are provided with one corresponding longitudinal sensing electrode line 822. The longitudinal sensing electrode lines 822 of each column are continuous. In some embodiments, an interval between the adjacent longitudinal sensing electrode lines 822 in the sensing electrode regions 820 is the same as an interval between the adjacent longitudinal dummy sensing electrode lines 812 in the driving electrode regions 810, so as to obtain a uniform electric field.

Figure 3:
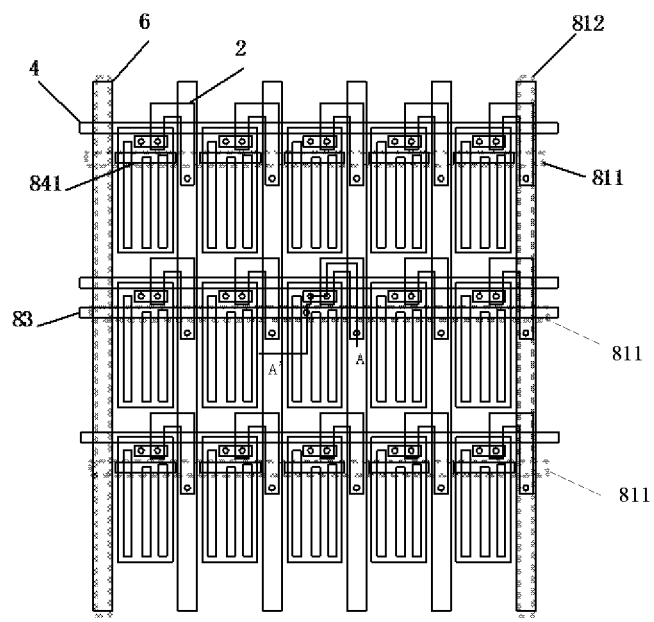
FIG. 3 is a plan view of pixel structures in a driving electrode region of an array substrate according to an embodiment of the present disclosure.
Figure 4:
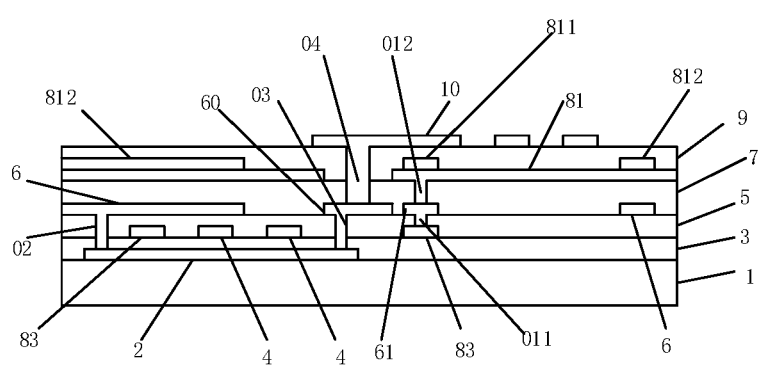
FIG. 4 is a sectional view of a driving electrode region of an array substrate taken along AA' according to an embodiment of the present disclosure.

According to an embodiment of the present disclosure, referring to FIG. 3 and FIG. 4, the first common electrode 81 is connected to the driving electrode line 83 through a first through hole 01 in a driving electrode region 810. The first through hole 01 includes a lower portion of first through hole 011 which penetrates through an interlayer insulating layer 5, and an upper portion of first through hole 012 which penetrates through a planarization layer 7. In the driving electrode region 810, the driving electrode line 83 is located on a gate line layer of a pixel unit and is parallel to a gate line 4, an orthographic projection of the driving electrode line 83 on a base substrate 1 of the array substrate overlaps with an orthographic projection, on the base substrate 1, of a transverse dummy sensing electrode line 811 in the same row as the driving electrode line 83. The first dummy driving electrode line 841 is also located on the gate line layer of the pixel unit. An orthographic projection of the first dummy driving electrode line 841 on the base substrate 1 overlaps an orthographic projection, on the base substrate 1, of the transverse dummy sensing electrode line 811 in the same row as the first dummy driving electrode line 841. An orthographic projection of a longitudinal dummy sensing electrode line 812 on the base substrate overlaps an orthographic projection of a data line 6 on the base substrate 1.

Figure 5:
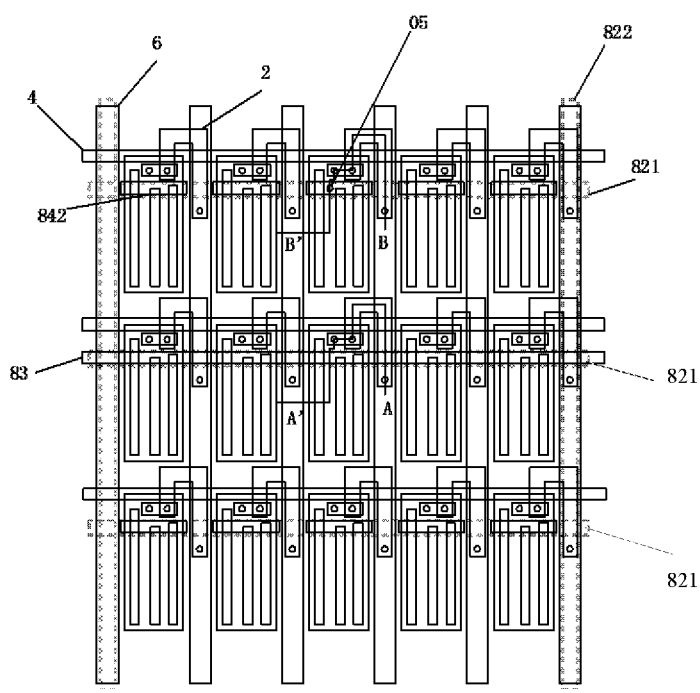
FIG. 5 is a plan view of pixel structures in a sensing electrode region of an array substrate according to an embodiment of the present disclosure.
Figure 6:
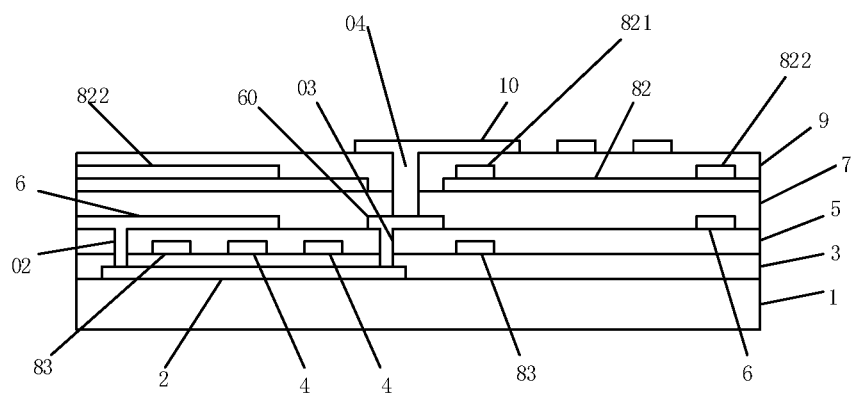
FIG. 6 is a sectional view of a sensing electrode region of an array substrate taken along AA' according to an embodiment of the present disclosure.
Figure 7:
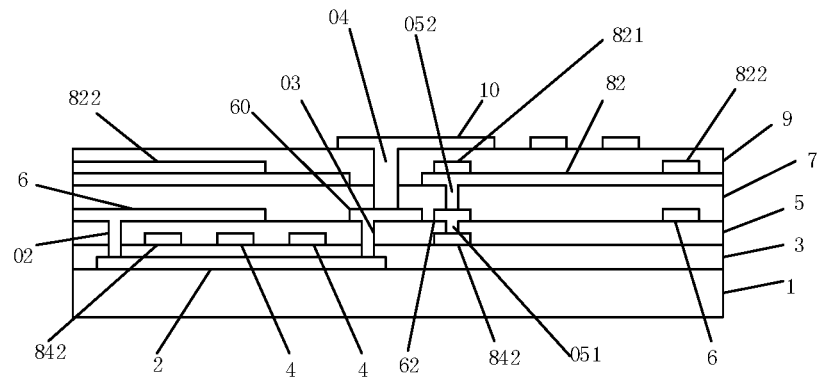
FIG. 7 is a sectional view of a sensing electrode region of an array substrate taken along BB' according to an embodiment of the present disclosure.

Referring to FIG. 5 to FIG. 7, the driving electrode line 83 is disconnected from the second common electrode 82 in a sensing electrode region 820. The second dummy driving electrode line 842 is connected to the second common electrode 82 through a fifth through hole 05. The fifth through hole 05 includes a lower portion of fifth through hole 051 which penetrates through the interlayer insulating layer 5, and an upper portion of fifth through hole 052 which penetrates through the planarization layer 7. In the sensing electrode region 820, the driving electrode line 83 is located on the gate line layer of the pixel unit and is parallel to the gate line 4, an orthographic projection of the driving electrode line 83 on the base substrate 1 overlaps an orthographic projection, on the base substrate 1, of a transverse sensing electrode line 821 in the same row as the driving electrode line 83. The second dummy driving electrode line 842 is located on the gate line layer of the pixel unit, an orthographic projection of the second dummy driving electrode line 842 on the base substrate 1 overlaps an orthographic projection, on the base substrate 1, of the transverse sensing electrode line 821 in the same row as the second dummy driving electrode line 842. An orthographic projection of the longitudinal sensing electrode line 822 on the base substrate 1 overlaps an orthographic projection of the data line 6 on the base substrate 1.

Since the fifth through hole 05 is between the second common electrode 82 and the second dummy driving electrode line 842, the sensing electrode region 820 and the adjacent driving electrode region 810 have similar circuit arrangement, so that the driving electrodes in the driving electrode regions 810 and the sensing electrodes in the sensing electrode regions 820 of the array substrate can generate similar electric fields, thereby enabling the array substrate to display more uniformly. Moreover, in order to reduce the influence of the transverse sensing electrode lines 821 and the longitudinal sensing electrode lines 822 in the sensing electrode regions 820 on the electric field as much as possible, the transverse dummy sensing electrode lines 811 and the longitudinal dummy sensing electrode lines 812 are correspondingly disposed on the common electrode in the driving electrode region. With the above dummy sensing electrode lines and the dummy driving electrode lines, more uniform electric fields in both the driving electrode regions and the sensing electrode regions can be obtained in the present disclosure, which reduces the influence of the sensing electrodes on the electric field of the array substrate to a great extent, and improves display quality.

Figure 2:
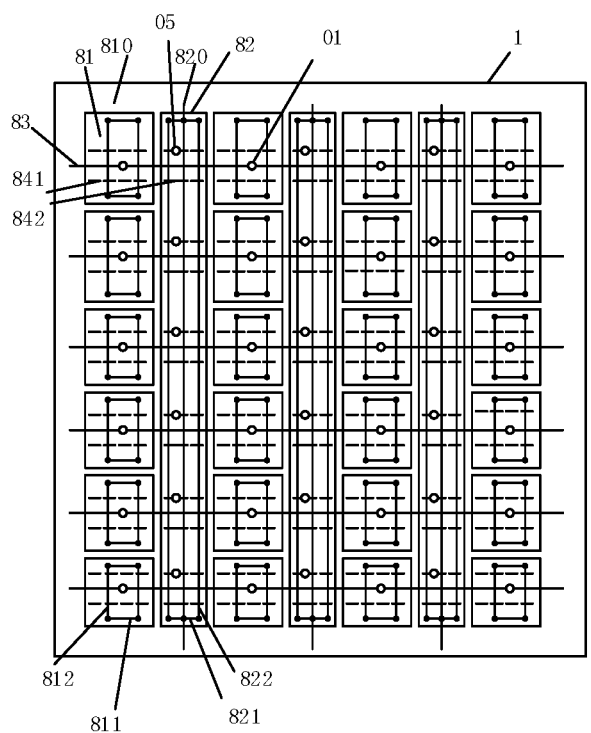
FIG. 2 is a plan view of another touch electrode of an array substrate according to another embodiment of the present disclosure.

In some embodiments, the first dummy driving electrode lines in the driving electrode regions and the second dummy driving electrode lines in the sensing electrode regions are disconnected from each other, and the first dummy driving electrode lines in the driving electrode regions that are adjacent along the column direction are disconnected from each other. The first dummy driving electrode lines in the driving electrode regions and the second dummy driving electrode lines in the sensing electrode regions are all in a floating state. The first dummy driving electrode lines in the driving electrode regions and the second dummy driving electrode lines in the sensing electrode regions may be continuous or intermittent. Referring to FIG. 2, the first dummy driving electrode line in the driving electrode region or the second dummy driving electrode line in the sensing electrode region includes a plurality of segments. That is, the first dummy driving electrode line in the driving electrode region and the second dummy driving electrode line in the sensing electrode region are intermittent. For example, the first dummy driving electrode line in each driving electrode region and the second dummy driving electrode line in each sensing electrode region are equally divided into four segments respectively.

Pixel structures in the driving electrode regions and pixel structures in the sensing electrode regions will be described in detail with reference to FIG. 3 to FIG. 7. FIG. 3 is a plan view of pixel structures in the driving electrode regions shown in FIG. 1 or FIG. 2, and FIG. 4 is a sectional view taken along AA' of FIG. 3. FIG. 3 shows an array of 3*5 pixel units. In the driving electrode region 810, a pixel electrode 10 is located above the first common electrode 81. The pixel electrode 10 is provided with a slit, and connected to a drain 60 of a thin film transistor of a pixel unit through a fourth through hole 04 penetrating through a first insulating layer 9 and the planarization layer 7. The first common electrode 81, and the transverse dummy sensing electrode line 811 and the longitudinal dummy sensing electrode line 812 which are located on the first common electrode 81 in the driving electrode region 810 serve as a driving electrode. The driving electrode line 83 is located on the gate line layer, the first common electrode 81 is connected to the driving electrode line 83 through the first through hole 01. The longitudinal dummy sensing electrode line 812 overlaps the data line 6 in a direction perpendicular to the base substrate 1, and the transverse dummy sensing electrode line 811 overlaps the driving electrode line 83 or the first dummy driving electrode line 841 in the direction perpendicular to the base substrate 1.

FIG. 5 is a diagram of pixel structures in the sensing electrode regions shown in FIG. 1 or FIG. 2. FIG. 6 is a sectional view taken along AA' of FIG. 5, and FIG. 7 is a sectional view taken along BB' of FIG. 5. The second common electrode 82, and the longitudinal sensing electrode line 822 and the transverse sensing electrode line 821 which are located on the second common electrode in the sensing electrode region serve as a sensing electrode. The longitudinal sensing electrode line 822 overlaps the data line 6 in the direction perpendicular to the base substrate 1, and the transverse sensing electrode line 821 overlaps the driving electrode line 83 or the second dummy driving electrode line 842 of the same row in the direction perpendicular to the base substrate 1. The driving electrode line 83 is disconnected from the second common electrode 82. The second common electrode 82 is connected to the second dummy driving electrode line 842 through the fifth through hole 05 in the sensing electrode region 820.

More specifically, as shown in FIG. 4, in a driving electrode region 810, a pixel unit including a driving electrode line includes: a base substrate 1; an active layer 2 located on the base substrate 1; a gate insulating layer 3 covering the active layer 2; a gate line 4 and a driving electrode line 83 located on the gate insulating layer 3; an interlayer insulating layer 5 covering the gate line 4, the driving electrode line 83, and the gate insulating layer 3; a data line 6, a drain 60 and a first auxiliary electrode 61 which are located on the interlayer insulating layer 5, with the data line 6 connected to a side of the active layer 2 through a second through hole 02, the drain 60 connected to the other side of the active layer through a third through hole 03, the first auxiliary electrode 61 connected to the driving electrode line 83 through a lower portion 011 of a first through hole 01, and the second through hole 02 and the third through hole 03 penetrating through the interlayer insulating layer 5 and the gate insulating layer 3; a planarization layer 7 covering the data line 6, the drain 60, the first auxiliary electrode 61 and the interlayer insulating layer 5; a first common electrode 81, a transverse dummy sensing electrode line 811 and a longitudinal dummy sensing electrode line 812 which are located on the planarization layer 7, with the transverse dummy sensing electrode line 811 and the longitudinal dummy sensing electrode line 812 located on the first common electrode 81, and the first common electrode 81 connected to the first auxiliary electrode 61 through an upper portion 012 of the first through hole 01; a first insulating layer 9 covering the first common electrode 81, the transverse dummy sensing electrode line 811, the longitudinal dummy sensing electrode line 812 and the planarization layer 7; and a pixel electrode 10 located on the first insulating layer 9 and connected to the drain 60 through a fourth through hole 04.

A pixel unit including a driving electrode line in a sensing electrode region 820 differs from the pixel unit including the driving electrode line in the driving electrode region in that a transverse sensing electrode line 821 and a longitudinal sensing electrode line 822 are located on a second common electrode 82, and the second common electrode 82 is not connected to the driving electrode line 83, as shown in FIG. 6.

A pixel unit excluding a driving electrode line in the sensing electrode region 820 differs from the pixel unit including the driving electrode line in the driving electrode region in that the transverse sensing electrode line 821 and the longitudinal sensing electrode line 822 are located on the second common electrode 82, the second common electrode 82 is connected to a second auxiliary electrode 62 through an upper portion 052 of a fifth through hole 05, and the second auxiliary electrode 62 is connected to a second dummy driving electrode line 842 through a lower portion 051 of the fifth through hole, as shown in FIG. 7.

According to the embodiment of the present disclosure, the sensing electrodes are connected to the second dummy driving electrode lines through the through holes, so that the common electrodes in the driving electrode regions and the common electrodes in the sensing electrode regions of the array substrate can generate similar electric fields, thereby realizing more uniform display.

Figure 8:
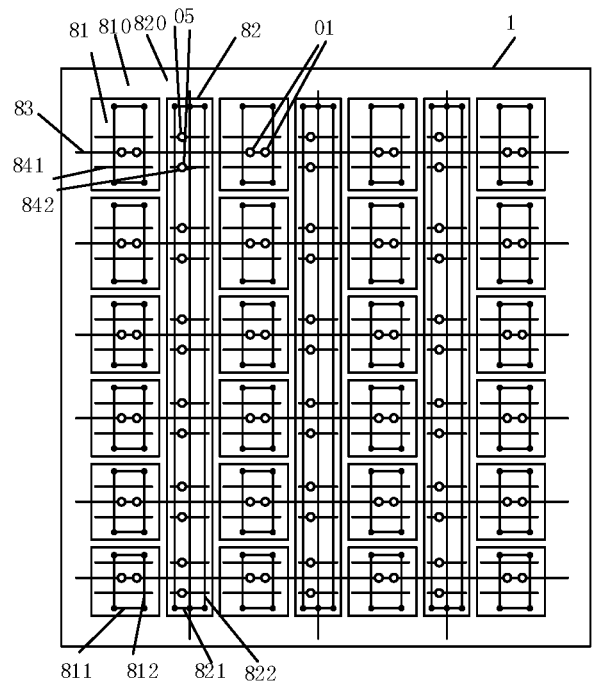
FIG. 8 is a plan view of touch electrodes of an array substrate according to another embodiment of the present disclosure.
Figure 9:
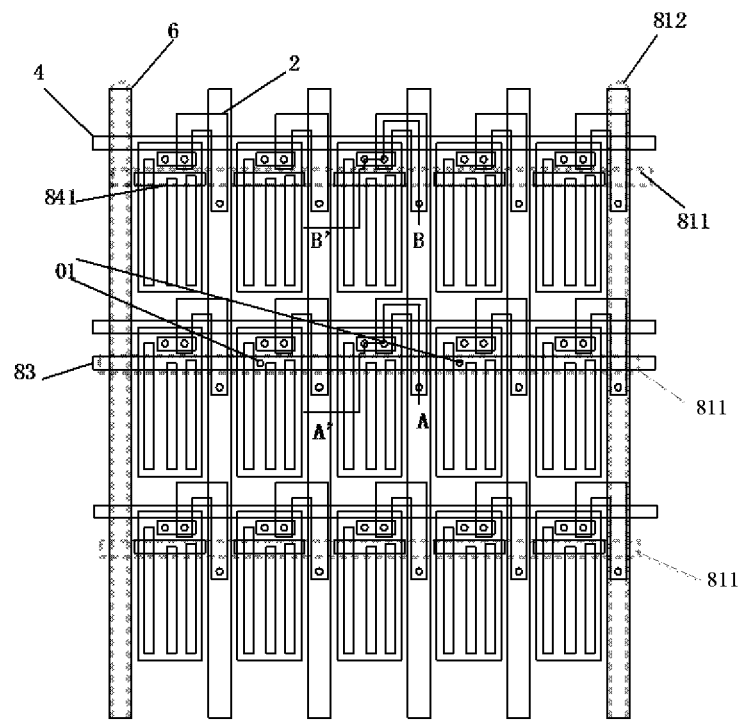
FIG. 9 is a plan view of a pixel structure in a driving electrode region of an array substrate according to another embodiment of the present disclosure.
Figure 10:
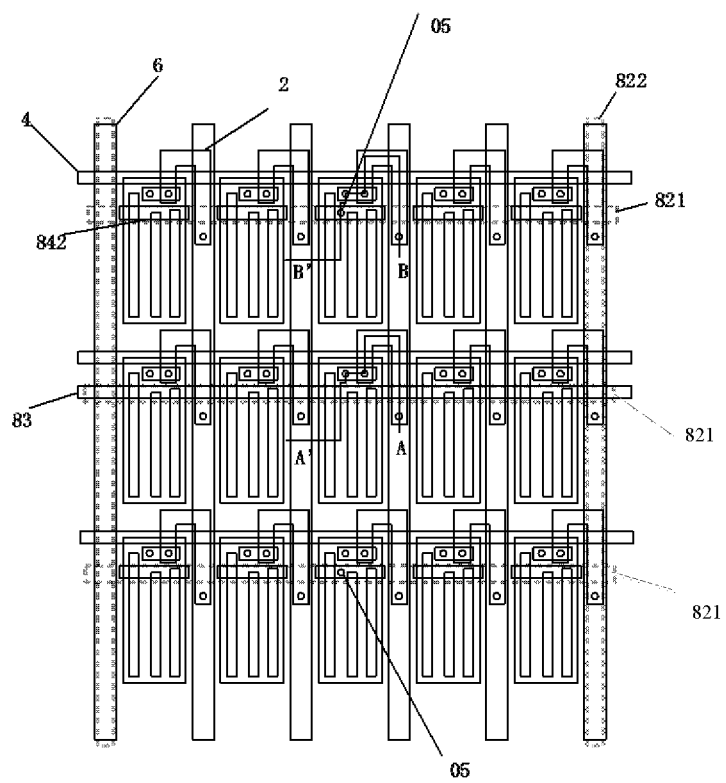
FIG. 10 is a sectional view of pixel structures in a sensing electrode region of an array substrate according to another embodiment of the present disclosure.

According to another embodiment of the present disclosure, two through holes may be located in the driving electrode region to connect the driving electrode line to the first common electrode, and correspondingly, two through holes may also be located in the sensing electrode region to connect the dummy driving electrode line to the second common electrode. FIG. 8 is a plan view illustrating common electrodes and electrode lines thereon of an array substrate, FIG. 9 is a plan view of pixel structures in the driving electrode regions of an array substrate, and FIG. 10 is a plan view of pixel structures in the sensing electrode regions of an array substrate. In this embodiment, a driving electrode line 83 is connected to a first common electrode 81 through two first through holes 01 in a driving electrode region 810; and, in an adjacent sensing electrode region 820, a fifth through hole 05 is located on each of the second dummy driving electrode lines 842 that are located on two sides of the driving electrode line 83 to connect the second dummy driving electrode line 842 to the second common electrode 82.

Figure 11:
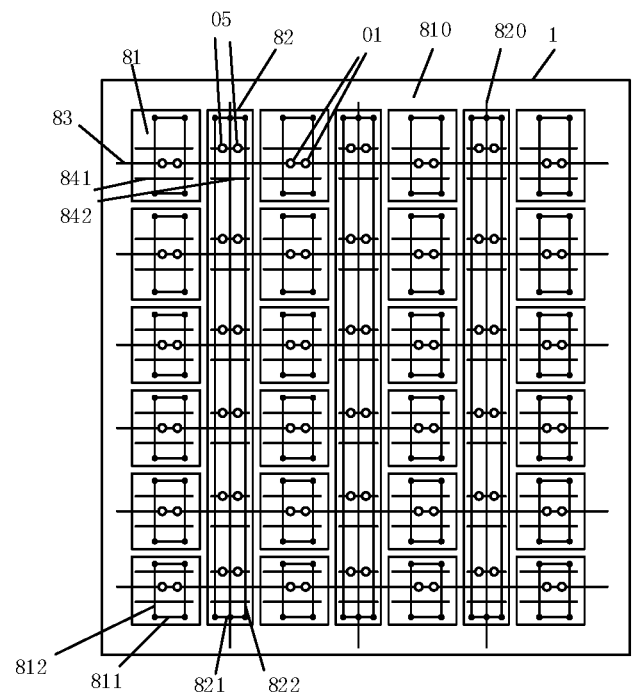
FIG. 11 is a plan view of a touch electrode of an array substrate according to still another embodiment of the present disclosure.

According to other embodiments of the present invention, two through holes may be provided in the driving electrode region to connect the driving electrode line to the first common electrode, and correspondingly, two through holes may also be provided in the sensing electrode region to connect the dummy driving electrode line to the second common electrode. FIG. 11 is a plan view of touch electrodes of an array substrate. In these embodiments, a driving electrode line 83 is connected to a first common electrode 81 through two first through holes 01 in a driving electrode region 810; and, in an adjacent sensing electrode region 820, both of two fifth through holes may be provided only in the second dummy driving electrode line 842 that is located on one side of the driving electrode line 83, while no through hole is provided on the second dummy driving electrode line 842 located on the other side of the driving electrode line 83. The second dummy driving electrode line 842 is connected to the second common electrode 82 through the fifth through holes.

In the present disclosure, the gates, the data lines, the driving electrode lines, the dummy driving electrode lines, the sensing electrode lines, and the dummy sensing electrode lines may all be made of metal materials, such as Cu, Al, Mo, Ti, Cr and W, or may be made of alloys of such materials, and may be made into a single-layer structure or a multi-layer structure, such as Mo\Al\Mo, Ti\Cu\Ti, and MoTi\Cu. The gate insulating layers, the interlayer insulating layers and the first insulating layers may be made of silicon nitride or silicon oxide; the gate insulating layers may be made into a single-layer structure, or a multi-layer structure, such as silicon oxide/silicon nitride. The planarization layers may be made of a resin material. The active layers may be made of a low temperature polysilicon. The pixel electrodes and the common electrodes may be made of ITO.

According to the other aspect of the present disclosure, the present disclosure further provides a liquid crystal display, which adopts the array substrate of the above embodiments.

In the Description of the present disclosure, the term "one embodiment", "another embodiment" or the like indicates that the specific feature, structure, material, or characteristic described in conjunction with such embodiment is included in at least one embodiment of the present disclosure. In the Description, the illustration of the above term is not necessarily intended to refer to the same embodiment or example. Furthermore, the specifically described features, structures, materials, or characteristics may be combined in any suitable manner in any one or more embodiments or examples. Moreover, those skilled in the art can combine the various embodiments or examples and the features therein that are described in the Description if no conflict is incurred.

It should be understood that the above embodiments are merely exemplary embodiments employed to illustrate the principles of the present disclosure, and the present disclosure is not limited thereto. Various changes, modifications, substitutions and variations can be made by those skilled in the art without departing from the spirit and essence of the present disclosure, and should be considered to fall within the scope of the present disclosure.

What is claimed is:

1. An array substrate, comprising at least one driving electrode region and at least one sensing electrode region alternately arranged along a row direction and disconnected from each other, each driving electrode region comprises one first common electrode and each sensing electrode region comprises one second common electrode respectively, at least one driving electrode line extends along the row direction and continuously passes through the driving electrode region and the sensing electrode region alternately arranged along the row direction, the first common electrode in the driving electrode region is connected to the driving electrode line through at least one first through hole, the second common electrode in the sensing electrode region is disconnected from the driving electrode line, wherein, the sensing electrode region is formed therein with at least one second dummy driving electrode line parallel to the driving electrode line, and the second common electrode in the sensing electrode region is connected to the second dummy driving electrode line through at least one fifth through hole, the array substrate further comprises a plurality of data lines and a plurality of gate lines intersect each other to define a plurality of pixel units, a dummy transverse sensing electrode line and a dummy longitudinal sensing electrode line are both located in the driving electrode region, electrically connected to each other, and both electrically connected to the driving electrode line through the first through hole, the dummy transverse sensing electrode line is in parallel with the plurality of gate lines, and the dummy longitudinal sensing electrode line is in parallel with the plurality of data lines, wherein an orthographic projection of the dummy transverse sensing electrode line on the array substrate overlaps orthographic projections of multiple data lines of the plurality of data lines on the array substrate, and an orthographic projection of the dummy longitudinal sensing electrode line on the array substrate overlaps orthographic projections of multiple gate lines of the plurality of gate lines on the array substrate.

2. The array substrate of claim 1, wherein a number of the fifth through holes is the same as a number of the first through holes.

3. The array substrate of claim 1, wherein the driving electrode region is formed therein with at least one first dummy driving electrode line parallel to the driving electrode line.

4. The array substrate of claim 3, wherein the array substrate comprises a plurality of pixel units arranged in a plurality of rows and a plurality of columns, a plurality of adjacent rows of pixel units are disposed with one driving electrode line, and each pixel unit where the driving electrode line is not formed in the sensing electrode region is disposed with one second dummy driving electrode line.

5. The array substrate of claim 4, wherein each pixel unit where the driving electrode line is not formed in the driving electrode region is disposed with one first dummy driving electrode line, and the first dummy driving electrode line is disconnected from the second dummy driving electrode line.

6. The array substrate of claim 1, wherein first common electrodes in driving electrode regions adjacent in a column direction are separated from each other, the second common electrodes in the sensing electrode regions are formed as one piece in the column direction, and the first common electrode is disconnected from the adjacent second common electrode in the row direction.

7. The array substrate of claim 3, wherein the second common electrode in each sensing electrode region is formed thereon with at least one transverse sensing electrode line and at least one longitudinal sensing electrode line, the at least one transverse sensing electrode line parallel to the driving electrode line in the row direction, and the at least one longitudinal sensing electrode line arranged in the column direction and connected to the at least one transverse sensing electrode line.

8. The array substrate of claim 7, wherein
the array substrate comprises a plurality of pixel units arranged in a plurality of rows and columns,
each pixel unit in the driving electrode region is formed therein with one transverse dummy sensing electrode line,
every multiple adjacent columns of pixel units in the driving electrode region are disposed with one longitudinal dummy sensing electrode line,
each row of pixel units in the sensing electrode region is disposed with one transverse sensing electrode line, and
every multiple adjacent columns of pixel units in the sensing electrode region are disposed with one longitudinal sensing electrode line.

9. The array substrate of claim 1, wherein
the first common electrode is connected to the driving electrode line through two first through holes in each driving electrode region, and
the second common electrode is connected to the second dummy driving electrode line through two fifth through holes in each sensing electrode region.

10. The array substrate of claim 9, wherein the two fifth through holes are respectively located in the second dummy driving electrode lines on two sides of the driving electrode line.

11. The array substrate of claim 9, wherein the two fifth through holes are both located in the second dummy driving electrode line on one side of the driving electrode line.

12. The array substrate of claim 3, wherein both the first and second dummy driving electrode lines are intermittent in the first and second common electrode regions.

13. The array substrate of claim 3, wherein both the first and second dummy driving electrode lines are continuous in the driving electrode region and the sensing electrode region.

14. The array substrate of claim 3, wherein
both the first and second dummy driving electrode lines are intermittent or continuous in the driving electrode region and the sensing electrode region, and
a size of the sensing electrode region in the row direction is smaller than a size of the driving electrode region in the row direction.

15. The array substrate of claim 7, wherein
the transverse and longitudinal dummy sensing electrode lines are on and in direct contact with the first common electrode in the driving electrode region, and
the transverse and longitudinal sensing electrode lines are on and in direct contact with the second common electrode in the sensing electrode region.

16. The array substrate of claim 7, wherein
in the driving electrode region, the driving electrode line is located on the same layer as the gate lines and parallel to the gate lines, an orthographic projection of the driving electrode line on a base substrate of the array substrate overlaps an orthographic projection of the transverse dummy sensing electrode line in the same row as the driving electrode line on the base substrate, the first dummy driving electrode line is located on the same layer as the gate lines and parallel to the gate lines, an orthographic projection of the first dummy driving electrode line on the base substrate overlaps an orthographic projection of the transverse dummy sensing electrode line in the same row as the first dummy driving electrode line on the base substrate, and an orthographic projection of the longitudinal dummy sensing electrode line on the base substrate overlaps an orthographic projection of the data line on the base substrate.

17. The array substrate of claim 7, wherein
in the sensing electrode region, the driving electrode line is located on the same layer as the gate lines and parallel to the gate lines, an orthographic projection of the driving electrode line on the base substrate overlaps an orthographic projection of the transverse sensing electrode line in the same row as the driving electrode line on the base substrate, the second dummy driving electrode line is located on the same layer as the gate lines and parallel to the gate lines, an orthographic projection of the second dummy driving electrode line on the base substrate overlaps an orthographic projection of the transverse sensing electrode line in the same row as the second dummy driving electrode line on the base substrate, and an orthographic projection of the longitudinal sensing electrode line on the base substrate overlaps an orthographic projection of the data line on the base substrate.

18. The array substrate of claim 7, wherein the array substrate comprises a plurality of pixel units arranged in a plurality of rows and a plurality of columns, and a pixel unit having the driving electrode line in the driving electrode region comprises:
a base substrate;
an active layer located on the base substrate;
a gate insulating layer covering the active layer;
the gate line and the driving electrode line located on the gate insulating layer;
an interlayer insulating layer covering the gate line, the driving electrode line and the gate insulating layer;
the data line, a drain and a first auxiliary electrode located on the interlayer insulating layer, with the data line connected to one side of the active layer through a second through hole, the drain connected to the other side of the active layer through a third through hole, and the first auxiliary electrode connected to the driving electrode line through a lower portion of the first through hole;
a planarization layer covering the data line, the drain, the first auxiliary electrode and the interlayer insulating layer;
the first common electrode located on the planarization layer, with the transverse and longitudinal dummy sensing electrode lines being on and in direct contact with the first common electrode, and the first common electrode connected to the first auxiliary electrode through an upper portion of the first through hole;
a first insulating layer covering the first common electrode, the transverse dummy sensing electrode line, the longitudinal dummy sensing electrode line and the planarization layer; and
a pixel electrode on the first insulating layer and connected to the drain through a fourth through hole.

19. The array substrate of claim 7, wherein the array substrate comprises a plurality of pixel units arranged in a plurality of rows and a plurality of columns, and at least one of the plurality of pixel units in the sensing electrode region and adjacent, in a row direction, to a pixel unit including the driving electrode line comprises:
a base substrate;
an active layer located on the base substrate;
a gate insulating layer covering the active layer;

the gate line and the second dummy driving electrode line located on the gate insulating layer;

an interlayer insulating layer covering the gate line, the second dummy driving electrode line and the gate insulating layer;

the data line, a drain and a second auxiliary electrode which are located on the interlayer insulating layer, with the data line connected to one side of the active layer through a second through hole, the drain connected to the other side of the active layer through a third through hole, and the second auxiliary electrode connected to the second dummy driving electrode line through a lower portion of the fifth through hole;

a planarization layer covering the data line, the drain, the second auxiliary electrode and the interlayer insulating layer;

the second common electrode located on the planarization layer, with the transverse and longitudinal sensing electrode lines located on and in direct contact with the second common electrode, and the second common electrode connected to the second auxiliary electrode through an upper portion of the fifth through hole;

a first insulating layer covering the second common electrode, the transverse sensing electrode line, the longitudinal sensing electrode line and the planarization layer; and a pixel electrode located on the first insulating layer and connected to the drain through a fourth through hole.

20. A touch liquid crystal display, comprising the array substrate of claim 1.

* * * * *